Oct. 11, 1960   G. W. ENGDAHL   2,955,962
DUST CLOTH
Filed Sept. 28, 1956
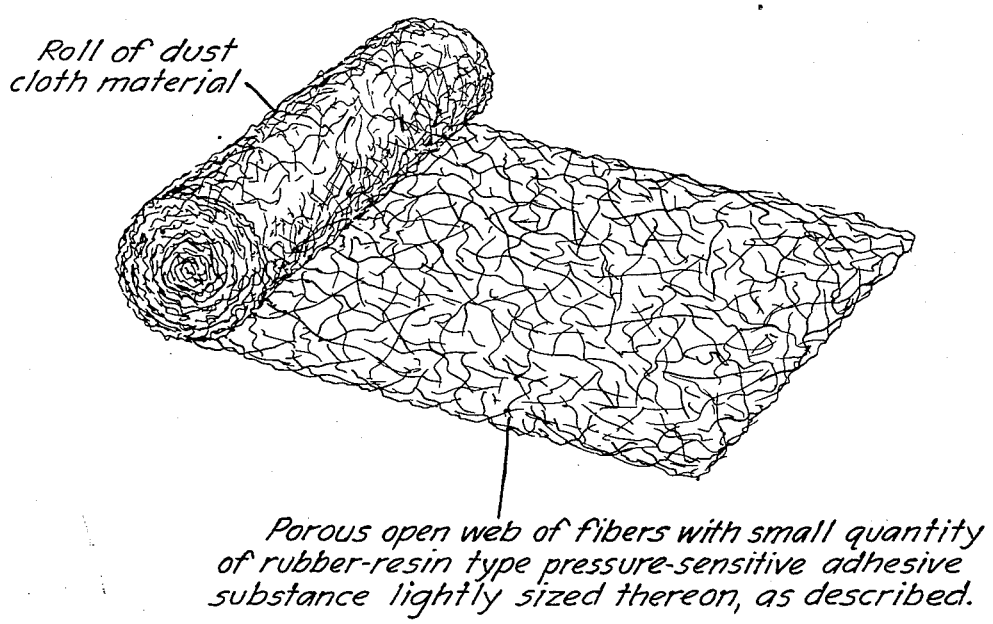
Roll of dust cloth material
Porous open web of fibers with small quantity of rubber-resin type pressure-sensitive adhesive substance lightly sized thereon, as described.
INVENTOR
GORDON W. ENGDAHL
BY
Carpenter, Abbott, Coulter & Kinney
ATTORNEYS

United States Patent Office 2,955,962
Patented Oct. 11, 1960

2,955,962

DUST CLOTH

Gordon W. Engdahl, St. Paul, Minn., assignor to Minnesota Mining and Manufacturing Company, St. Paul, Minn., a corporation of Delaware Filed Sept. 28, 1956, Ser. No. 612,871

7 Claims. (Cl. 117—140)

This invention relates to a new article of manufacture, and in particular, relates to a new type of dust cloth comprising a thin, readily conformable and pliable web lightly sized with a minute quantity of a rubber-resin type pressure-sensitive adhesive substance.

In household cleaning, it is desirable to remove dust and foreign particles from a surface without raising or spreading the dust or foreign particles through the air, or smudging, soiling or otherwise contaminating the surface. Many presently marketed cleaning materials for this purpose have an oily or waxy base. Thus they cause light surface films of wax or oil to be deposited during cleaning. Such deposits are not always desirable, and in many cases, soil or interfere with the beauty of certain "natural" finishes on furniture. Moreover, oily deposits on a surface tend to attract dust, and the dust free appearance of such a surface is short-lived.

Additionally, dust cloths impregnated with an oily or waxy base are messy to use in that transfer of the oil or wax from the dust cloth to the hand occurs.

The use of industrial "tack rags" for household cleaning does not provide a ready expedient. One such type of tack rag is formed by dipping a cloth in varnish, and allowing the varnish to partially dry until it reaches a suitably tacky state. But this type of tack rag is messy to use, and has only a short useful life, gradually losing its tack and becoming too stiff to conform to a surface during cleaning.

Another type of industrial tack rag employs certain chlorinated compounds to gain tackiness. Most of these compounds, however, are known to be toxic under certain conditions; thus they are generally unsuitable for household use, where the possibility exists that a small child will play with a dust cloth, and even place it in his mouth.

The art, therefore, is sorely in need of an improved type of household dust cloth which does not leave an oily deposit, or the like, when used, which can be stored for lengthy periods under ordinary storage conditions without loss of its required properties, and which is not toxic. This invention provides such an article.

The article hereof possesses the particular advantage of being and remaining highly flexible and pliable for an almost unlimited period of time. It may be characterized as non-stiffening. It can be formed so as to be non-toxic. In use, it can be pressed readily into conformity with gradual surface irregularities to pick up foreign particles such as dust therefrom without leaving a waxy or oily deposit on the surface. Dust and foreign particles readily cling to my dust cloths; yet my dust cloths do not stick or cling to surfaces over which they are lightly rubbed or passed to accomplish cleaning. Using my dust cloths, surfaces can be cleaned without raising dust or the like into the air.

One of the materials used in fabricating my articles is well known in the pressure-sensitive adhesive tape art as a rubber-resin type pressure-sensitive adhesive substance. Pressure-sensitive adhesives in the tape art have the property of being aggressively and stably tacky; and when such tapes are applied to surfaces under light finger pressure, they cling with such tenacity that, usually, greater force must be employed to separate them from the surface than was originally employed during their application. Sliding such adhesives over surfaces with ease and without tenacious clinging to the surface has heretofore been a property, the lack of which has been notorious in pressure-sensitive adhesive articles; yet, such a property is, surprisingly, patently evident in the new articles hereof, even though pressure-sensitive adhesive substances constitute an essential and even primarily functional part of my articles.

I have found that by employing extremely small amounts of pressure-sensitive adhesive substances, amounts heretofore considered insufficient to provide a product having any usefulness or utility, and by employing such small amounts in combination with a thin, pliable, highly porous web of fibers, it is possible to achieve the surprising result of providing a highly useful dust cloth article possessing an unusual and unexpected combination of desirable properties, as aforesetforth.

A drawing, containing descriptive legends, is made a part hereof and will serve to further illustrate the article of this invention.

The amount of pressure-sensitive adhesive substance which I employ in making my articles is far below the amount customarily employed in the fabrication of pressure-sensitive adhesive articles. I do not use amounts in excess of 3 grains per 24 square inches of thin web material. Preferably I employ only approximately 1 to 2 grains per 24 square inches of web material, or even smaller amounts, whereas the amount of pressure-sensitive substance employed in the pressure-sensitive tape art is always in excess of about 5 grains per 24 square inches of tape backing, and customarily has been even as high as 20 or more grains per 24 square inches of backing. As aforestated, greatly lower amounts have heretofore been considered unsatisfactory to provide useful articles.

For the web material of my new articles, I employ thin, readily conformable and pliable, highly porous, fibrous web or sheet materials. The web may be formed from filaments or fibers of such materials as, for example, cotton, rayon, linen, wool, synthetic substances, etc. The web may be woven or unwoven; it may be comprised of a regular network of intermeshed fibers such as, for example, cheese cloth, or it may be comprised of irregular randomly oriented fibers. It may be somewhat felted, or even napped, but in all cases it is highly porous, having an "open" structure of entangled or intermeshed fibers, and is thin. If the web is held near the eyes, objects on the other side of the web can be made out through the openings or pores of the web; the web is not a solid sheet such as employed as backings in the pressure-sensitive tape art.

Likewise, my dust cloth sheet article is highly porous; it is not a unified, i.e., impregnated, sheet such as employed as the backing for certain pressure-sensitive adhesive tapes.

A preferred, but non-limitative example of my dust cloth and a method for making the same will now be illustrated.

*Example 1*

The porous web of this example was formed from viscose rayon fibers in the following manner. A tow consisting of a mass of substantially aligned, untwisted, 1.5 denier, viscose rayon filaments was cut into 2" lengths to gain a mass of substantially untwisted staple fibers. These short fibers were then formed into a mat using a felting machine such as sold by the Curlator Corporation under the trade-name "Rando-Webber." The fibers were fed into the felting machine on a traveling belt which carried the fibers under a very finely toothed or knurled roll. The roller teeth in this machine are so fine that they pick up only one fiber—or at most only a few fibers—at a time from the belt, and shift the fibers into a rapidly moving air stream which carries them suspended in air through a venturi. After passing through the venturi, the suspended fibers are deposited in random orientation upon a rotating relatively large condensing roll which contains fine perforations through which the air is withdrawn from the suspension while the fibers are filtered out to form a matted web. The fibers of the web are twisted and intermingled during its formation, and this imparts a certain amount of strength to the web, i.e., sufficient strength to permit the web to be handled carefully without its falling apart.

A highly porous matted web having a dry weight of ½ ounce per square yard and a maximum thickness of about 4 mils was formed using the above procedure. After forming the web, one may wind it into a storage roll using an interliner to separate the convolutions in the roll. Preferably, however, the web is taken directly off the condensing roll and saturated with a dilute solution of a rubber-resin type pressure-sensitive adhesive substance.

The rubber-resin type pressure-sensitive adhesive substance used to form the dust cloth of this example was a single polymer inherently possessing the proper balance of properties required for such adhesive substances, as particularly set forth below. To form the polymer, 300 parts by weight of methyl isoamylacrylate monomer were polymerized in a solution of 700 parts of ethyl acetate solvent using 2 parts of benzoyl peroxide as a catalyst. The solution was held at 60° C. under continuous agitation for 5 hours until the polymerization was largely completed, and then raised to 70° C. for about one hour. A viscous solution containing about 30% non-volatiles resulted. This solution was cooled to room temperature and diluted to about 10% non-volatiles with additions of heptane to provide a very dilute and highly fluid mixture.

The non-woven web formed above was carefully drawn through this dilute solution of adhesive. After thus saturating the web, it was dried by passing it at a speed of about 10 yards per minute over successive hot cans held at about 90° C. There resulted a coating weight or concentration of polymethyl isoamylacrylate of about 1 to 2 grains per 24 square inches of web. The finished web was still highly porous; the amount of polymethyl isoamylacrylate on the web was insufficient to unify the web or fill its pores, but was sufficient to lightly size, i.e., essentially coat, individual fibers or fibrous elements of the web. Further, the individual fibers of the web were somewhat bonded to each other at their points of intersection by the very small amount of pressure-sensitive adhesive substance applied thereto, and the finished dust cloth could be subjected to ordinary handling, such as encountered in dusting operations, without individual fibers of the web falling or "linting" out.

The finished dust cloth was wound upon itself into a roll, and for the convenience of users, is desirably marketed in this form. The surfaces of the "cloth" were found not to stick together in the roll, and it could be easily unwound and cut into suitable lengths for dusting use. Instead of winding a length of the dust cloth material into a roll, it can immediately be cut into dust cloths of suitable size, and the cloths folded and conventionally packaged for marketing.

The dust cloth of this example was soft and easily folded, crumpled, etc. It could be crumpled into a ball and thereafter unfolded and flattened out with ease. Surfaces of the dust cloth did not stick together; yet when used to clean a surface, dust and foreign particles readily clung to the cloth. The porous nature of the dust cloth served to provide many recesses in the cloth into which particles of dust might lodge during cleaning. Lint or other deposits of foreign material such as oil were not left upon surfaces over which the dust cloth was rubbed to accomplish cleaning. After using the dust cloth for cleaning, it could be rinsed out with water and re-used without substantial diminution of its original properties.

Open web materials, the fibers of which are sized with the pressure-sensitive adhesive substance of this example, or with related adhesive substances consisting largely of a synthetic saturated polymeric material which inherently possesses the required four-fold balance of properties for a rubber-resin type pressure-sensitive adhesive, as hereinafter defined, constitute the preferred dust cloths of this invention for the reason that they are particularly resistant to aging, and exhibit very little tendency to become stiff even after extremely prolonged storage.

The following non-limitative examples further illustrate the new dust cloths of this invention.

*Example 2*

The web used in making the dust cloth of this example was formed according to the following procedure: A mixture of about 40% thermoplastic cellulose acetate fibers and 60% non-thermoplastic viscose (regenerated cellulose or rayon) fibers were carded to form a porous mat of intermixed and randomly oriented fibers. The thermoplastic cellulose acetate fibers were of about 3 denier size and 1.25 inches long. The viscose fibers were about 1.5 denier and 2 inches long. The porous mat or web of these fibers was passed through a system of heated rolls so as to lightly press and heat the fibers of the web, and cause the thermoplastic fibers to interbond at their points of intersection. As a result of this treatment, the viscose fibers remained randomly oriented through the randomly oriented and interbonded network of thermoplastic fibers, and were loosely held in the network by mechanical restraint and frictional contact. After this step, the web was lightly moistened with water and passed between a pair of resilient squeeze rolls, over a series of supporting rolls, and through a second pair of resilient squeeze rolls. The latter pair of squeeze rolls were rotated at a rate of speed somewhat greater than the first pair. The supporting rolls were located in a tunnel through which the web passed and in which a heated atmosphere of steam was maintained. The heat and steam served to maintain the fibers of the web in a soft condition and prevented them from drying out during the stretching operation conducted between the pairs of squeeze rolls. After the web was stretched, it was cooled to room temperature and thereby "fixed" in its stretched condition.

A web of this type is suitably stretched to an extent sufficient to reduce its width by at least about 20%. This causes the fibers of the web to be slightly turned and crowded together in a lengthwise direction, and imparts a considerable lengthwise strength to the web, so that when it is jerked lengthwise it produces a clothlike snapping sound. Width strength of the web is, of course, weak. It may relatively easily be stretched across its width by simply pulling in a crosswise direction to its length.

A highly porous, pliable web formed in the foregoing manner, and having a weight of about 0.6 ounce per square yard and a maximum thickness of about 4 mils, was saturated with a dilute solution of a pressure-sensitive adhesive substance containing the following ingredients:

| | Parts by weight |
|---|---|
| Polyvinyl ethyl ether | 100 |
| Terpene phenolic resin | 15 |
| Antioxidant | 2 |

The vinyl ether used had an inherent viscosity of about 3.2 as calculated from the viscosities of dilute solutions in benzene solvent as measured on the Ostwald viscometer. The terpene phenolic resin is a commercial resin sold by Newport Industries, Inc. under the trade-name "Newport S" and is believed to consist of the condensation product of a Friedel-Crafts type reaction between phenol and alpha- and beta-pinene, and to comprise about 20-25% phenol by weight. The antioxidant was 2,5 ditertiary amyl hydroquinone.

The ingredients above were dissolved in a mixture of about 20 parts ethanol and 1200 parts toluene to form a dilute solution. This dilute solution was sprayed upon the web in an amount sufficient to provide, upon evaporation of solvent, a coating or concentration of approximately 1 to 2 grains of adhesive substance per 24 square inches of web material. The sprayed web was then dried of solvent by passing it over successive hot cans at about 80° C. to form a highly porous dust cloth having properties comparable to those of the cloth of Example 1. Again, the fibers of the web were lightly sized with the pressure-sensitive adhesive substance.

Example 3

Another dust cloth was formed by saturating the web of Example 2 with a dilute solvent solution of the following pressure-sensitive adhesive ingredients:

| | Parts by weight |
|---|---|
| Pale crepe natural rubber | 100 |
| "Piccolyte S-115" resin | 85 |
| Antioxidant of Example 2 | 1 |

The "Piccolyte S-115" resin, sold by Pennsylvania Industrial Chemicals Corporation, is a polyterpene resin melting at about 115° C., with essentially zero acid number.

The rubber and antioxidant were first milled together on a rubber mill until the rubber mass was rendered smooth and uniform. The resin and milled mass were then dissolved in a mixture of 25 parts of ethanol and sufficient heptane to give a dilute soltuion, i.e., about 10% solids by weight, which was used to saturate the web. The saturated web was dried as described in Example 2 and contained about 1-2 grains of the adhesive solids per 24 square inches. The finished dust cloth was highly porous, and as in the previous examples, contained an amount of adhesive substance only sufficient to lightly size the individual fibers of the web.

Example 4

Another dust cloth was formed using a web consisting of an open-weave cotton cloth known as cheese cloth. The following pressure-sensitive adhesive blend was used.

| | Parts by weight |
|---|---|
| High molecular weight polyisobutylene | 100 |
| Antioxidant of Example 2 | 1.1 |
| Low molecular weight polyisobutylene | 70 |
| "Hercolyn" resin | 30 |
| "Piccolyte S-85" resin | 45 |

The high molecular weight polyisobutylene (commercially available as "Vistanex B-120") was a non-tacky rubbery or elastomeric polymer of isobutylene monomers, whereas the low molecular weight polyisobutylene (commercially available as "Vistac No. 1, Indopol H300") was a highly tacky resinous type polymer. "Hercolyn" resin is marketed by the Hercules Powder Company and is stated by the manufacturer to be largely methyl dihydroabietate. "Piccolyte S-85" resin is a polyterpene resin melting at about 85° C., with essentially zero acid number.

The high molecular weight polyisobutylene and antioxidant were milled on a rubber mill to render the rubbery polyisobutylene smooth and uniform. Thereafter, all components of the adhesive substance were dissolved in sufficient heptane to form a solution containing only about 10% solids by weight. The cheese cloth web was sprayed with the resulting dilute adhesive solution, and the solvent evaporated. A weight of about 1 to 2 grains of adhesive per 24 square inches of web was used, and was just sufficient to lightly size the individual fibers of the woven cheese cloth.

The treated sheet was effective in removing dust from polished surfaces without leaving any stain. It did not feel sticky to the fingers, and was easily folded or rolled into a ball and again unfolded during dusting operations. When soiled, it could be rinsed out in water and dried for further use.

Various pressure-sensitive adhesive substances may be used to form the dust cloths hereof. Examples of typical rubber-resin type pressure-sensitive adhesive may be found in U.S. Patents Nos. 2,236,527, 2,410,078, 2,410,089, 2,438,195, and 2,553,816. These adhesives are generally formed from at least two components, i.e., a rubbery material and a resinous tackifier material, from whence they get the name "rubber-resin pressure-sensitive adhesives." They have a rubbery base material, either natural or synthetic, which provides cohesion (internal strength) and elasticity (a retractive force when stretched and retraction when released after stretching). The rubbery material is modified by blending with a compatible tackifier resin (such as a rosin or ester gum) which serves to increase adhesion (tackiness) and decrease cohesion with an attendant increase of stretchiness (elongation under low stresses) and decrease of elasticity. These rubber-resin type adhesives have a proper four-fold balance of adhesion, cohesion, stretchiness and elasticity; and when they are used in the manufacture of pressure-sensitive adhesive tapes, this balance of properties imparts to the resulting tape the characteristic of being aggressively and stably tacky, and yet capable of being stripped back from a smooth surface to which it is temporarily applied without delamination, splitting, or offsetting of adhesive. As indicated above with respect to Example 1, certain synthetic polymers are inherently pressure-sensitive and possess the required four-fold balance of properties. They are equivalents of rubber-resin adhesives and are regarded as of the rubber-resin type. A further illustrative example of such a synthetic polymer, and one useful in forming the articles hereof, is a 75:25 copolymer of 2-ethyl-butyl-acrylate and ethyl-acrylate.

This invention will be seen to provide an entirely new and useful article of commerce which, while formed from well known materials, possesses properties heretofore not associated with such materials. No presently available dust cloth known to me possesses all the advantageous properties possessed by my article, such properties including that of being and remaining pliable and flexible even after long periods of storage, that of being non-toxic, that of readily picking up dust and holding onto the dust particles, and yet not leaving residual surface films or deposits such as oil upon surfaces over which the cloth is passed in cleaning.

That which is claimed is:

1. A storable, non-toxic, porous, readily conformable and pliable dust cloth to which dust readily clings, said dust cloth being easily slidable over surfaces under light finger pressure without clinging to the surfaces and without depositing foreign materials thereupon, and being easily unfolded and flattened without surfaces of the cloth sticking together after being crumpled into a ball, said dust cloth comprising a thin non-unified, porous web of fibers, said web having an "open" structure and having a weight on the order of about one-half ounce per square yard, and a small quantity of an adherent rubber-resin type pressure-sensitive adhesive substance lightly sized upon the fibers of said web, the quantity of said adhesive substance being not in excess of 3 grains per 24 square inches of said web.

2. A storable, non-toxic, porous, readily conformable and pliable dust cloth to which dust readily clings, said dust cloth being easily slidable over surfaces under light finger pressure without clinging to the surfaces and without depositing foreign materials thereupon, and being easily unfolded and flattened without surfaces of the cloth sticking together after being crumpled into a ball, said dust cloth comprising a thin, non-unified, highly porous web of fibers, said web having an "open" structure and having a weight on the order of about one-half ounce per square yard, and a small quantity of an adherent rubber-resin type pressure-sensitive adhesive substance lightly sized upon the fibers of said web, the quantity of said adhesive substance being approximately 1 to 2 grains per 24 square inches of said web.

3. A storable, non-toxic, porous, readily conformable and pliable dust cloth to which dust readily clings, said dust cloth being easily slidable over surfaces under light finger pressure without clinging to the surfaces and without depositing foreign material thereupon, and being easily unfolded and flattened without surfaces of the cloth sticking together after being crumpled into a ball, said dust cloth comprising a thin, non-unified, highly porous web of fibers, said web having an "open" structure and having a weight on the order of about one-half ounce per square yard, and a small quantity of an adherent rubber-resin type pressure-sensitive adhesive substance consisting essentially of a saturated polymeric material lightly sized upon the fibers of said web, the quantity of said adhesive substance being not in excess of 3 grains per 24 square inches of said web.

4. The article of claim 3 wherein the saturated polymeric material is polymethyl isoamylacrylate.

5. As a new article of manufacture: a roll of a length of a storable, non-toxic, porous, readily conformable and pliable dust cloth sheet material to which dust readily clings, said dust cloth sheet material being easily unwound from said roll without surfaces thereof sticking together, being easily slidable over surfaces under light finger pressure without clinging to the surfaces and without depositing foreign materials thereupon, and comprising a thin, non-unified, highly porous web of fibers, said web having an "open" structure and having a weight on the order of about one-half ounce per square yard, and a small quantity of an adherent rubber-resin type pressure-sensitive adhesive substance lightly sized upon the fibers of said web, the quantity of said adhesive substance being not in excess of 3 grains per 24 square inches of said web.

6. As a new article of manufacture: a roll of a length of storable, non-toxic, porous, readily conformable and pliable dust cloth sheet material to which dust readily clings, said dust cloth sheet material being easily unwound from said roll without surfaces thereof sticking together, being easily slidable over surfaces under light finger pressure without clinging to the surfaces and without depositing foreign materials thereupon, and comprising a thin, non-unified, highly porous web of fibers, said web having an "open" structure and having a weight on the order of about one-half ounce per square yard, and a small quantity of an adherent rubber-resin type pressure-sensitive adhesive substance consisting essentially of a saturated polymeric material lightly sized upon the fibers of said web, the quantity of said adhesive substance being not in excess of 3 grains per 24 square inches of said web.

7. A storable, non-toxic, porous, readily conformable and pliable dust cloth to which dust readily clings, said dust cloth being easily slidable over surfaces under light finger pressure without clinging to the surfaces and without depositing foreign material thereon, and being easily unfolded and flattened without surfaces of the cloth sticking together after being crumpled into a ball, said dust cloth comprising a thin non-unified, porous web of nonwoven, intermingled fibers, said web having an "open" structure and having a weight on the order of about one-half ounce per square yard, and a small quantity of an adherent rubber-resin type pressure-sensitive adhesive substance lightly sized upon the fibers of said web and serving, in addition to its function as a material to which dust clings, to bond various of said fibers together at their points of intersection, the quantity of said adhesive substance being not in excess of 3 grains per 24 square inches of said web.

References Cited in the file of this patent

UNITED STATES PATENTS

| 1,633,076 | Dorsey | June 21, 1927 |
| 2,438,195 | Tierney | Mar. 23, 1948 |
| 2,528,602 | Magit | Nov. 7, 1950 |
| 2,719,806 | Nottebohm | Oct. 4, 1955 |